March 4, 1941.   C. L. LAWRANCE   2,233,669
GEARED CONNECTING ROD MEANS FOR ENGINES
Filed May 19, 1938   2 Sheets-Sheet 1
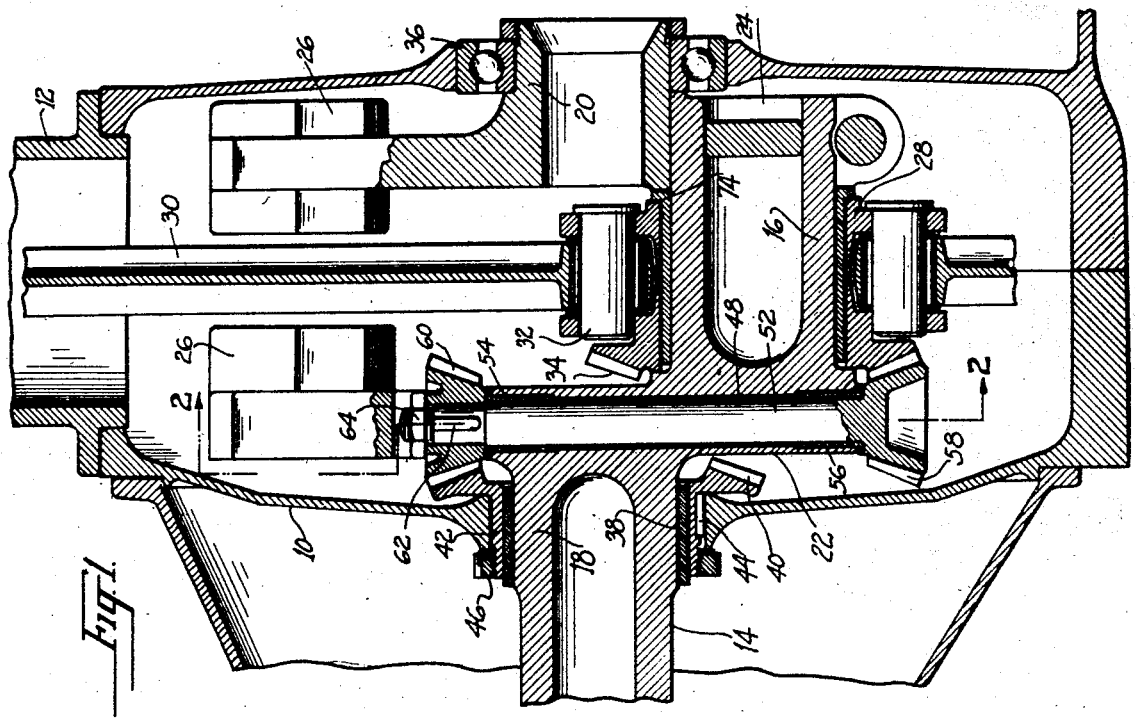
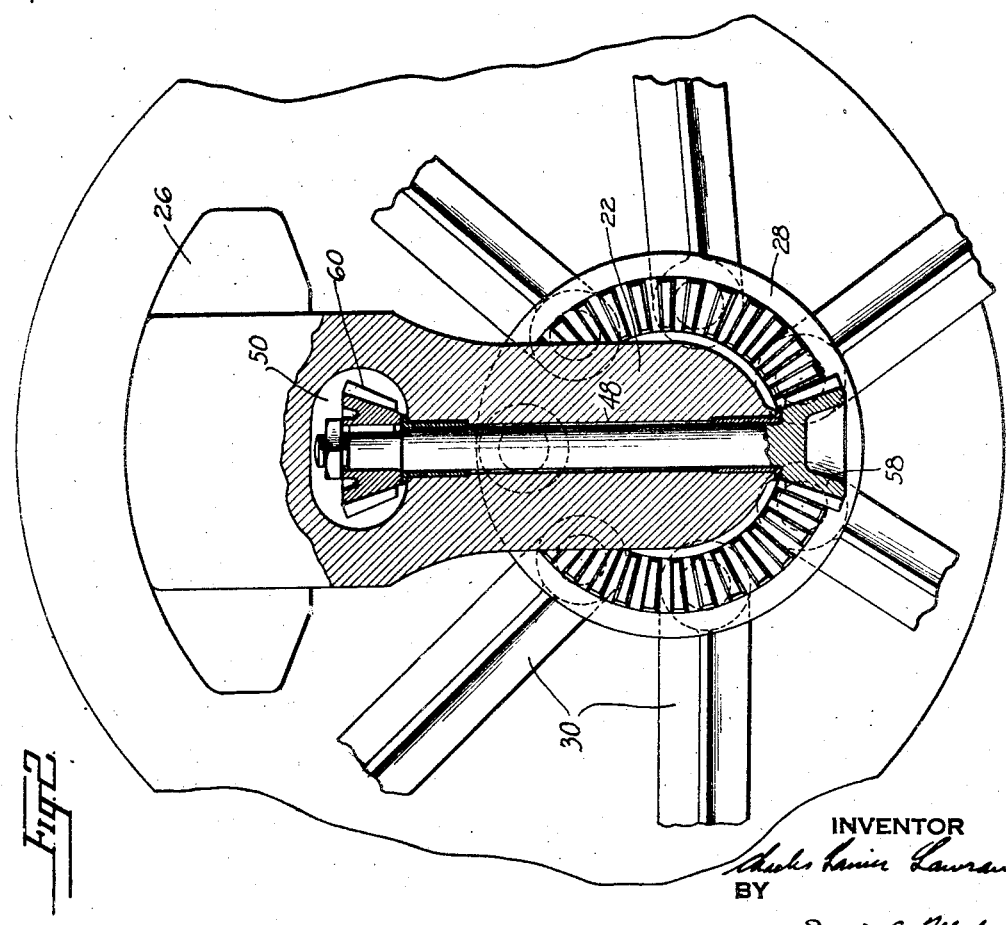
INVENTOR
Charles Lanier Lawrance
BY
ATTORNEY March 4, 1941.   C. L. LAWRANCE   2,233,669
GEARED CONNECTING ROD MEANS FOR ENGINES
Filed May 19, 1938   2 Sheets-Sheet 2
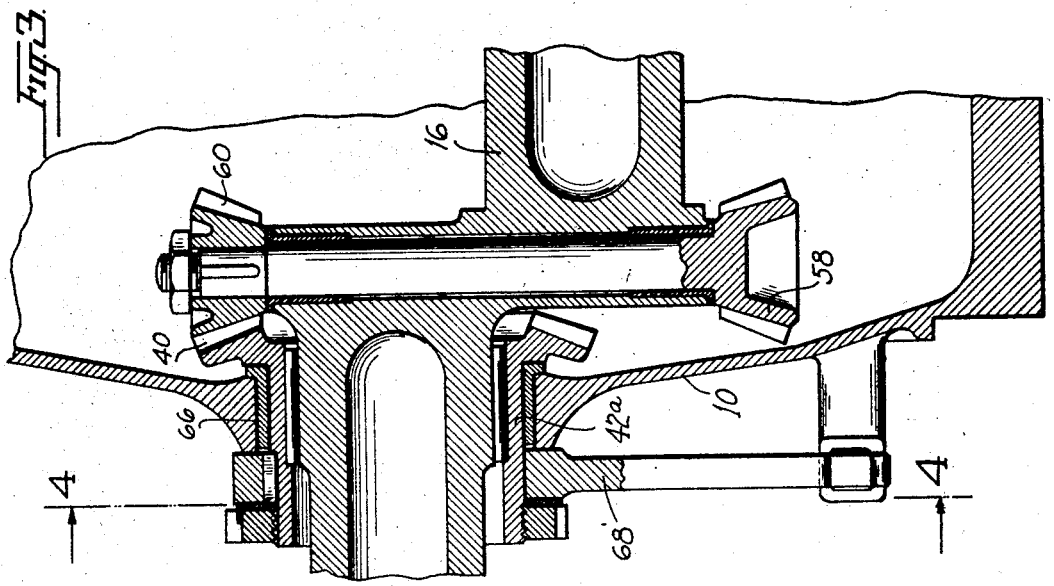
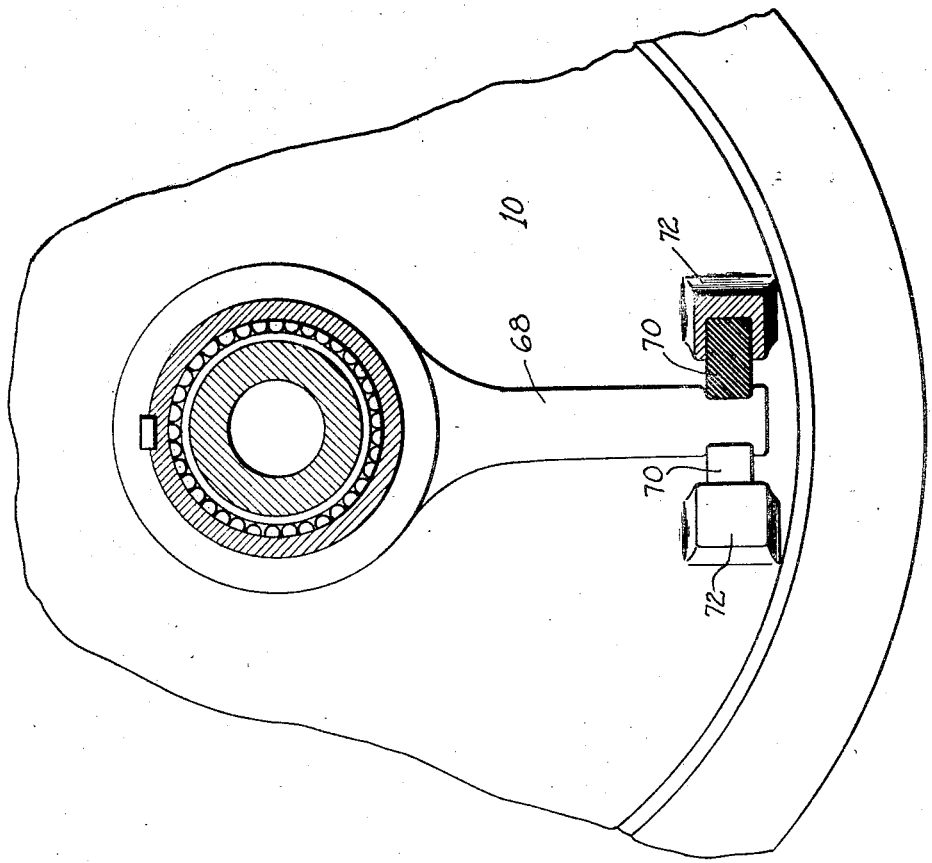
INVENTOR
Charles Lanier Lawrance
BY
ATTORNEY Patented Mar. 4, 1941

2,233,669

UNITED STATES PATENT OFFICE 2,233,669

GEARED CONNECTING ROD MEANS FOR ENGINES

Charles Lanier Lawrance, New York, N. Y., assignor to Lawrance Engineering and Research Corporation, Linden, N. J., a corporation of Delaware Application May 19, 1938, Serial No. 208,786

9 Claims. (Cl. 74—580)

The present invention relates to engines and has particular reference to radial engines in which a plurality of connecting rods are connected to deliver power to a common crank pin.

In engines of this kind the usual practice has been to provide one master connecting rod, journaled at one of its ends directly on the crank pin, and to connect the remaining connecting rods to the master rod rather than directly to the crank pin. This construction results in slight differences in the motion transmitted to the pistons attached to the several connecting rods.

In order to eliminate such differences, different forms of construction have been proposed in which all of the connecting rods which transmit power to a common crank pin are connected by means of suitable articulated connections to a member rotatably mounted on the crank pin and constrained to move parallel to itself as it follows the rotating crank pin.

The general object of the present invention is to improve upon constructions of this latter type and to provide means for connecting the pistons of a bank of radially arranged cylinders to a common crank pin, which means is simple and rugged in construction, very compact, and of a nature such that the several pistons travel with like motion.

Other and more detailed objects of the invention and the advantages to be derived from its use will best be understood from a consideration of the ensuing portion of this specification, descriptive of suitable embodiments of apparatus for carrying the invention into effect:

In the accompanying drawings forming a part hereof,

Fig. 1 is a central section of part of a radial engine embodying the invention;

Fig. 2 is a section taken on the line 2—2 of Fig. 1;

Fig. 3 is a fragmentary central section showing a variation of part of the structure shown in Fig. 1; and Fig. 4 is a view taken on line 4—4 of Fig. 3.

Referring now more particularly to Figs. 1 and 2, 10 designates the crank case structure of the engine to which are attached the several cylinders 12, one of which appears in Fig. 1. The crank shaft 14 provides a crank pin 16 connected to the main bearing portions 18 and 20 of the shaft by means of webs 22 and 24. In the embodiment illustrated, the crankshaft is shown as of built up construction, the journal portion 18, web 22, and crank pin 16 being an integral forging and one end of the crank pin being clamped in the web 24 which is suitably recessed and split to receive one end of the pin. The webs 22 and 24 are each advantageously provided with the usual balancing counter weights 26.

An annular connecting rod member or spool 28 is journaled on crank pin 16 and each of the several connecting rods 30 is connected at one end to this spool for pivotal movement with respect to the spool, advantageously by means of suitable bearing pins 32. At one side, the spool 28 carries a bevel gear 34 advantageously formed by teeth cut in the spool itself.

One main bearing for the crankshaft is provided by the ball bearing 36 and the other main bearing is formed by the journal bearing 38. A bevel gear 40 is mounted in the crank case adjacent to and facing the crank web 22 and this gear is advantageously made in the form illustrated, with an annular sleeve portion 42 passing through a suitable opening in the crank case structure and keyed against rotation with respect to the crank case, as by means of a key 44. The gear is maintained against axial displacement by means of a suitable clamping or locking ring 46. The sleeve portion of the gear forms suitable backing for the bearing 38. Obviously, in so far as the present invention is concerned, any desired type of main and connecting rod bearing construction can be employed and any suitable mounting arrangement may be employed for gear 40.

The crank web 22 is provided with a bore 48 extending inwardly from the crank pin end of the web and passing through the axis of rotation of the crankshaft. Adjacent to the counter weight, the web is formed with an opening 50 extending transversely through the web, with which opening the bore 48 communicates. A shaft 52 is rotatably mounted in bore 48 by means of suitable bearings 54 and 56 and carries at its opposite ends the bevel pinions 58 and 60 respectively, which are fixed rigidly to the shaft. In the embodiment illustrated, pinion 58 is formed integrally with the shaft and pinion 60 is suitably keyed or splined to the shaft as indicated at 62 and held on the shaft by means of the retaining nut 64 threaded on the inner end of the shaft.

Pinion 58 meshes with gear 34 on the connecting rod spool 28 and pinion 60, which is situated in the opening 50 in the crank web, meshes with the fixed gear 40.

Gears 34 and 40 have the same pitch circle diameters and pinions 58 and 60 also have the same pitch circle diameters.

The operation of the apparatus just described will be largely obvious from the drawings. As the crankshaft revolves, the pinion 60, carried by the shaft 52, will be caused to roll on the fixed gear 40 thus causing the shaft 52 to revolve about its own axis and through the pinion 58 and gear 34 the spool 28 will be caused to rotate relative to pin 16. Since the ratio between gear 40 and pinion 60 is the same as the ratio between gear 34 and pinion 58, the rotation of gear 34 relative to pinion 58 will be the same as the relative rotation between gear 40 and pinion 60, and since the gear 40 is rotationally fixed it follows that gear 34 will move parallel to itself, that is, without rotation about its own axis, as it moves in its circular orbit around the axis of rotation of the crankshaft. While in the illustrated embodiment pinions 58 and 60 have been shown of like size and gears 40 and 34 are also of like size, it will be evident that the controlling factor required to secure the desired motion of gear 34 parallel to itself is that the ratio of gear 40 and pinion 60 be the same as the ratio between gear 34 and pinion 58.

I have found from analysis that with certain numbers of cylinders in a bank and certain cycles of operation, that there are no reversals of force imposed on the spool member by the connecting rods which would tend to cause the spool member to oscillate about the axis of the crank pin as a center. Consequently, in engines having this characteristic, force transmission through the gearing is always in one direction. When such is the case, gear 40 may advantageously be rigidly fixed to the crank case.

In other cases, the number of cylinders used and their cycle of operation may be such that forces are transmitted by the connecting rods to the spool in such fashion that force reversals do occur which tend to cause the spool member to oscillate about the axis of the crank pin. In such cases, such oscillation is prevented only by the gearing connecting the spool member to the crank case structure and such force reversals are transmitted through the gearing.

Under such conditions it may in some instances be advisable to provide some degree of resilience in the connection between the spool member and the abutment which absorbs the forces transmitted through the gearing.

Such a construction is illustrated in Figs. 3 and 4 in which the sleeve portion 42a of the gear 40 is journaled in the crank case structure as at 66 and at its outer end has splined or keyed thereto an arm 68, the end of which is resiliently held between elastic pads 70 fixed in sockets formed in suitable brackets or lugs 72 on the crank case. With this construction a certain degree of resilience is introduced which serves to reduce the degree of shock load imposed on the gearing when force reversals occur, which obviously is desirable from noise and vibration standpoints as well as from the standpoint of reducing the value of the fatigue producing forces imposed on the gear teeth.

It will be evident that many other arrangements may be employed for providing some degree of resilience in the connection between the connecting rod spool and the crank case or other fixed structure to which it is connected through the gearing.

It will be evident from the foregoing that the construction provided by the present invention is very simple and rugged in its nature and is, moreover, very compact. As will be observed from the drawings, this arrangement can be embodied without increasing the required length between adjacent main bearings, thus enabling the rigid crankshaft construction resulting from closely adjacent main bearings to be retained. Also, it will be observed that insofar as the pinion and pinion shaft construction is concerned, the pinions 58 and 60 directly oppose each other so that end thrust on these pinions and on the shaft 52 may readily be balanced out. The end thrust on the crankshaft introduces no new factor of material importance since the crankshaft is normally provided in any event with one or more thrust absorbing bearings. Such end thrust as is imposed on the gear 34 may readily be absorbed by a suitable thrust bearing such as is indicated at 74, and which because of the relatively large diameter of the crank pin, can readily be made of such size as to absorb the thrust without involving undesirably high unit bearing pressures.

Various changes and modifications in the structures hereinbefore described by way of illustration may be made without departing from the spirit or scope of the invention which is to be understood as embracing all forms of construction falling within the scope of the appended claims when they are construed as broadly as is consistent with the state of the prior art.

What is claimed is:

1. In an engine having a crank case structure, in combination, a crankshaft mounted in said crank case structure and having a crank web and a crank pin, said web having a bore extending inwardly from the crank pin end of the web and communicating at its inner end with a recess open at the outer face of the web and offset from the center of rotation of the crankshaft, a spool rotatably mounted on the crank pin, connecting rods secured to said spool, a bevel gear on said spool facing the inner side of said web, a second bevel gear non-rotatably mounted with respect to said crank case structure coaxially with the axis of rotation of the crankshaft and facing the outer side of said web, a pinion shaft rotatably mounted in said bore, a bevel pinion fixed at the outer end of said shaft and meshing with the spool gear, a second bevel pinion fixed on said shaft and located in said recess, said second pinion meshing with said non-rotatably mounted gear, and the gear ratio between each of said pinions and its meshing gear being the same.

2. In an engine having a crankcase structure, in combination, a crankshaft mounted in said crank case structure and having a main bearing, a crank pin and a crank web, said web comprising a crank arm and a counter weight arm and having a bore extending from the crank pin end of the web inwardly thereof and terminating in a recess open at the outer side of the web, said recess being located in the counter weight arm of the web, a spool rotatably mounted on the crank pin, connecting rods secured to said spool, a bevel gear on said spool facing the inner side of said web, a second bevel gear non-rotatably mounted with respect to said crank case structure coaxially with the axis of rotation of the crankshaft and facing the outer side of said web, a pinion shaft rotatably mounted in said bore, a bevel pinion fixed at the outer end of said shaft and meshing with the spool gear, a second bevel pinion fixed on said shaft and located in said recess, said second pinion meshing with said non-rotatably mounted gear, and the gear ratio between each of said pinions and its meshing gear being the same.

3. In an engine having a crank case structure, in combination, a crankshaft mounted in said crankcase structure and having a main bearing, a crank pin and a crank web, said web comprising a crank arm and a counter weight arm and having a radially extending bore passing from the outer end of the crank arm through the axis of rotation of the crankshaft and terminating at its inner end in a recess open at the outer side of the crank web, a spool rotatably mounted on the crank pin, connecting rods secured to said spool, a bevel gear on said spool facing the inner side of said web, a second bevel gear non-rotatably mounted with respect to said crank case structure coaxially with the axis of rotation of the crankshaft and facing the outer side of said web, a pinion shaft rotatably mounted in said bore, a bevel pinion fixed at the outer end of said shaft and meshing with the spool gear, a second bevel pinion fixed on said shaft and located in said recess, said second pinion meshing with said non-rotatably mounted gear, and the gear ratio between each of said pinions and its meshing gear being the same.

4. In an engine having a crankcase structure, the combination with a crankshaft mounted in said crankcase structure and having a crank web and a crank pin, of a connecting rod spool rotatably mounted on the crank pin, a bevel gear on said spool and means providing a yielding force transmitting connection between said spool and an abutment provided by said crankcase structure for producing the same relative rotational speed between the spool and the crank pin as the relative rotational speed between the crankshaft and said crankcase structure, said means including a bevel gear non-rotatably mounted with respect to said crankcase structure and a pair of bevel pinions carried by said crank web and mounted to rotate about axes substantially radial with respect to the axis of rotation of the crankshaft, one of said pinions meshing with the spool gear and the other of said pinions meshing with the crankcase gear.

5. In an engine having a crankcase structure, the combination with a crankshaft mounted in said crankcase structure and having a crank web and a crank pin, of a connecting rod spool rotatably mounted on the crank pin, an annular gear mounted coaxially with the axis of rotation of the crankshaft, means for yieldably restraining said gear against rotation with respect to the crankshaft structure while permitting limited angular movement relative thereto, a gear on said spool and a force transmitting connection between said gears, said connection including rigidly connected gears carried by the crank web and mounted to rotate about a common axis radial with respect to the axis of rotation of the crankshaft, the last mentioned gears meshing respectively with the two first mentioned gears and said connection operating to produce the same relative rotational speed between the spool and the crank pin as the relative rotational speed between the crankshaft and the gear having limited relative angular movement with respect to the crankcase.

6. In an engine, in combination, a crank shaft having a main bearing, a crank pin and a crank web, a crank case having a support for said main bearing, an annular bevel gear around said main bearing, said gear facing the outer side of said crank web and having a sleeve portion extending between the main bearing and the main bearing support, an arm fixed to the outer end of said sleeve and means fixed to the crank case structure of the engine for yieldably restraining said arm against rotation with respect to said crank case structure, a spool on said crank pin, connecting rods secured to said spool, a bevel gear on said spool facing the inner side of the crank web, a pinion shaft carried by the crank web, and two pinions fixed to said pinion shaft, one of said pinions meshing with said annular gear and the other of said pinions meshing with the spool gear, the ratio between each pinion and its meshing gear being the same.

7. In an engine having a crank case structure, the combination with a crankshaft mounted in said crankcase structure and having a crank pin, of a spool rotatably mounted on the crank pin, a bevel gear on said spool around the crank pin, a bevel gear non-rotatably mounted with respect to said crank case structure around the axis of the crankshaft, and a driving connection carried by a part of the crankshaft for connecting said gears, said driving connection including two co-axial bevel pinions each meshing with a different one of the two first mentioned gears and mounted with the common axis of rotation of the bevel pinions coinciding with a line intersecting the respective axes of the two first mentioned gears.

8. In an engine having a crankcase structure, the combination with a crankshaft mounted in said crankcase structure and having a crank pin, of connecting rod spool rottably mounted on the crank pin, a bevel gear on said spool mounted coaxially with the axis of the crank pin, a bevel gear non-rotatably mounted with respect to said crank case structure coaxially with the axle of rotation of the crankshaft, and a driving connection carried by a part of the crankshaft for connecting said gears, said driving connection including two coaxially mounted bevel pinions each meshing with a different one of the two first mentioned gears and mounted with the common axis of rotation of the bevel pinions intersecting the axis of rotation of the crankshaft and the axis of the crank pin.

9. In an engine having a crankcase structure, the combination with a crankshaft mounted in said crankcase structure and having a crank web and a crank pin, of a connecting rod spool rotatably mounted on the crank pin, a bevel gear on said spool and means providing a yielding force transmitting connection between said spool and an abutment provided by said crankcase structure for producing the same relative rotational speed between the spool and the crank pin as the relative rotational speed between the crankshaft and said crankcase structure, said means including a bevel gear non-rotatably mounted with respect to said crankcase structure and a pair of connected bevel pinions carried by said crank web, one of said pinions meshing with the spool gear and the other of said pinions meshing with the crankcase gear.

CHARLES LANIER LAWRANCE.